March 22, 1966     W. E. DOWDA     3,242,027
METHODS OF PRODUCING MOLDED ARTICLES
Original Filed Oct. 6, 1954     4 Sheets-Sheet 1

INVENTOR
WILLIAM E. DOWDA

BY Browne, Schuyler & Beveridge
ATTORNEY

March 22, 1966  W. E. DOWDA  3,242,027
METHODS OF PRODUCING MOLDED ARTICLES
Original Filed Oct. 6, 1954  4 Sheets-Sheet 2
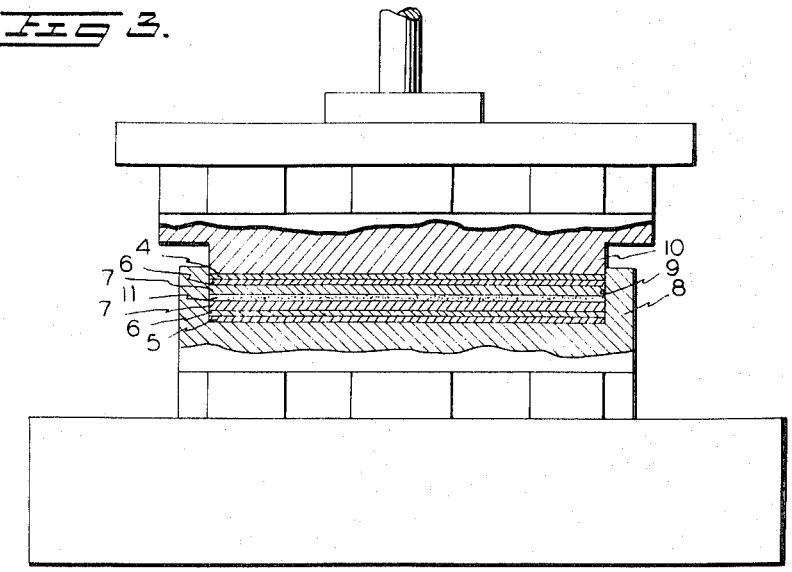
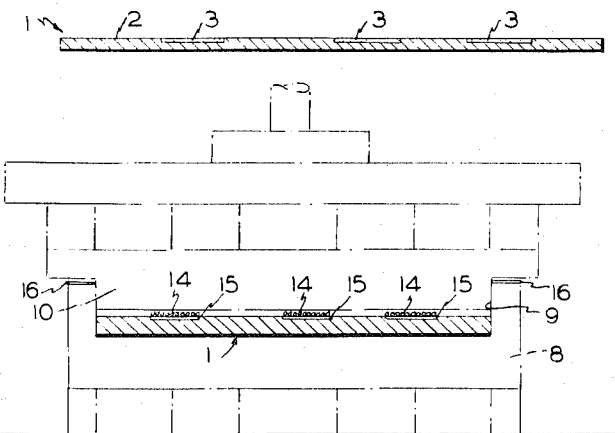
INVENTOR
WILLIAM E. DOWDA
BY Browne, Schuyler &
Beveridge  ATTORNEY March 22, 1966 W. E. DOWDA 3,242,027
METHODS OF PRODUCING MOLDED ARTICLES
Original Filed Oct. 6, 1954 4 Sheets-Sheet 3
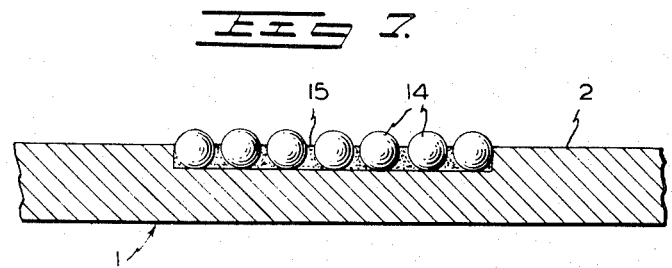
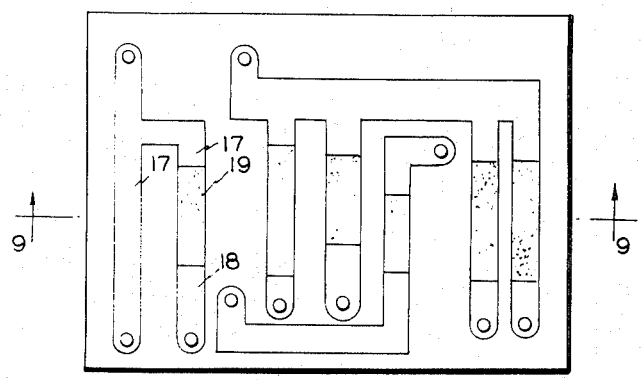
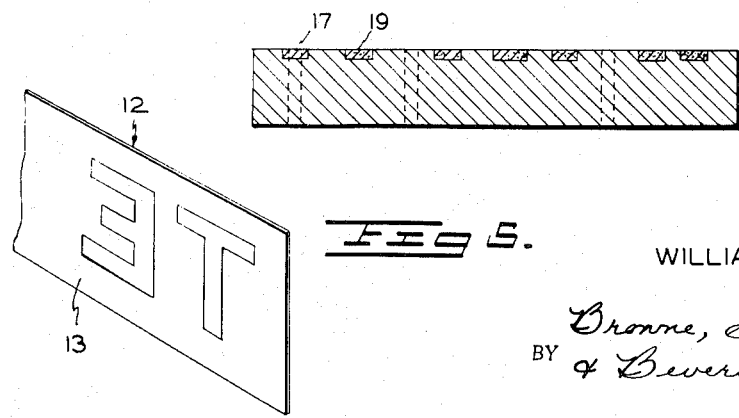
INVENTOR
WILLIAM E. DOWDA
BY Bronne, Schuyler & Beveridge
ATTORNEY March 22, 1966         W. E. DOWDA         3,242,027
METHODS OF PRODUCING MOLDED ARTICLES
Original Filed Oct. 6, 1954         4 Sheets-Sheet 4
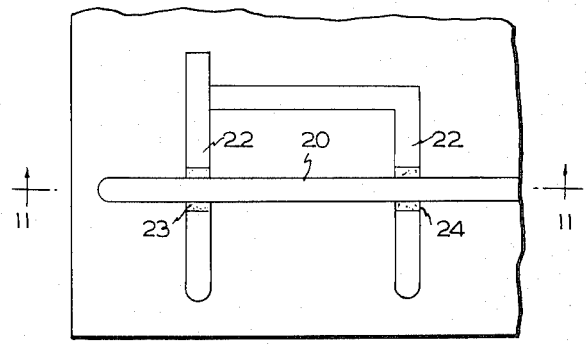
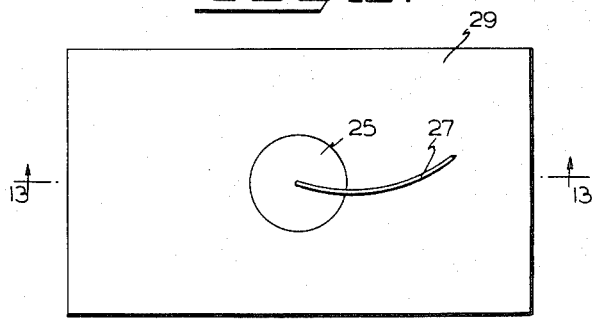
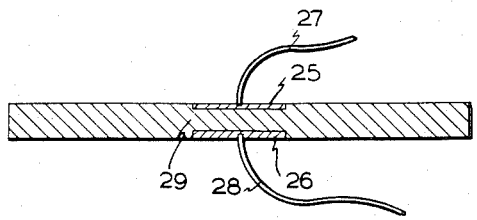
INVENTOR
WILLIAM E. DOWDA
BY Browne, Schuyler
& Beveridge
ATTORNEY 3,242,027
METHODS OF PRODUCING MOLDED ARTICLES
William E. Dowda, Atlanta, Ga., assignor to Gladwin Plastics, Inc., Atlanta, Ga., a corporation of Georgia
Original application Oct. 6, 1954, Ser. No. 460,708, now Patent No. 3,063,182, dated Nov. 13, 1962. Divided and this application Oct. 28, 1960, Ser. No. 70,869
7 Claims. (Cl. 156—277)

This invention relates to methods of producing molded articles and, more particularly, to producing molded articles having at least one surface which includes a design or the like, such as lettering.

This application is a divsion of my copending application Serial No. 460,708, filed October 6, 1954, now Patent No. 3,063,182.

The present invention is directed broadly to the problem of producing a molded article having at least one surface which includes a design or the like, lettering for example, of substantially permanent nature. An example of such a molded article is a sign panel wherein one surface carries lettering, the lettering being of one color and the background for the lettering being of a different color. In the making of signs and other displays it is, of course, common practice to paint a design, such as lettering, on a background surface. However, a painted sign, and for that matter any sign wherein the design is attached to the background surface by adhesion, is subject to the objections that the design may become chipped, can be scraped off, may separate from the background by splitting away from it, or may be otherwise damaged. In metal signs, highway markers, for example, substantial damage occurs because of the susceptibility of such signs to damage by rocks and other articles and resultant weathering and rusting.

By following the teaching of the present invention, it is possible to provide a sign, among other articles, which is lightweight, relatively strong, and in which the surface design is substantially permanent and not easily damaged. In fact, the design is actually bonded into the surface on which it appears and lies substantially flush with this surface. The design coheres with the background on which it appears and is thus attached by a cohesion rather than an adhesion technique. Furthermore, such a sign can be produced at a cost competitive with other materials, such as metal, and requires much less maintenance, repainting, for example, than is required for signs made of metal, wood or the like.

In addition to having utility for the production of signs, both reflective and non-reflective, the present invention also has utility in the field of electrical circuits and circuit components of the type generally described as printed circuits. By following the teaching of the present invention it is possible to bond into and directly with a panel body conductive portions arranged in a desired circuit layout wherein the conductive portions and the panel body form essentially an integral whole. As compared to printed circuits formed by the usual adhesion techniques, an electrical circuit or component made according to the teaching of the present invention has greater permanency, will withstand rougher handling and may be worked with more easily.

It is accordingly an object of the present invention to provide a method for making a molded article having at least one surface including a design or the like wherein the design, lettering for example, is intimately bonded with the article and extends into the body from the surface on which it appears.

It is another object of the present invention to provide a method of making such an article wherein the design, lettering for example, may be of different color from the background on which it appears.

It is another object of the present invention to provide a method of making such an article wherein the design may be light reflective.

It is another object of the present invention to provide such an article wherein the design may be electrically conductive.

It is a further object of the present invention to provide new and improved methods of making such articles.

Briefly described, the method of the present application is employed to produce an article, a sign panel for example, of molded reinforced thermoset resin wherein at least one face of the panel includes a design, lettering for example, sharply outlined and of different color from the background surface on which it appears and wherein the design is actually bonded with the body of the panel and lies substantially flush with the surface on which it appears. In fact, the panel body and the design, although of different color, have the same basic chemical composition and molecular structure.

In making such a sign, a preferred procedure is to first screen process the desired design onto a sheet of porous material, a fiber glass mat for example, by applying a thermosetting composition, including polyester resin for example, onto the porous sheet until the resin penetrates substantially the full thickness of the sheet. The screened-on design is then allowed to gel partially.

A backing sheet of porous material and one or more intermediate sheets of porous material are then laid up in a mold. Another thermosetting composition, including polyester resin for example, is then spread over the exposed upper surface of the uppermost intermediate layer. Then, one or more additional intermediate sheets of porous material are placed over the spread-out thermosetting composition which is in the mold and, finally, the sheet containing the design is placed on top with the design uppermost.

The mold is then closed and heat and pressure applied to the sheets of porous material and the thermosetting compositions which are within the mold until a complete cure is obtained. When the sign is taken from the mold, it is found that the molding composition has penetrated from the middle throughout the entire body of the sign except in that portion of the body which is occupied by the screened-on design. The design lies substantially flush with the surface on which it appears, is sharply outlined with respect to the background, and is actually bonded into the body of the sign so that it is an integral part thereof. The polymerization of the polyester resins appears to achieve a molecular linking of the design with the rest of the body. It is to be understood, of course, that the quantity of the molding composition is sufficient so that it can penetrate throughout the body as described. It is to be further understood that the screening composition and the molding composition may have color pigments dispersed therethrough so that the design is of one color and the background of a contrasting color.

By opening the mold before the screened-on design has completely cured, it is possible to dust very small glass beads onto the tacky surface of the screened-on design and then when the mold is closed and the cure completed the glass beads are held firmly in place. This results in a light reflective sign. Although the screened-on design is still tacky at the stage when the molding is interrupted, the background itself is quite hard due to the different time phase in the molding cycle.

By substituting an electrically conductive substance or substances for a color pigment, for example, the teaching of the present invention is readily employed in making electrical circuits and circuit components of the type generally referred to as printed circuits.

Other objects and advantages of the present invention will become more apparent from the following detailed description taken in conjunction with the attached drawings wherein:

FIG. 3 is a view showing a step in the process of making the sign shown in FIG. 1;

FIG. 4 is a sectional view taken on line 4—4 of FIG. 1;

FIG. 5 is a view showing a step in the process of making a sign like that shown in FIG. 1 according to another teaching of the present invention;

FIG. 6 is a view similar to FIG. 3 showing a step in the making of a light reflective sign;

FIG. 7 is an enlarged detail view in section of a portion of a light reflective sign;

FIG. 8 is a plan view of an article made according to the teachings of the present invention including electrically conductive portions;

FIG. 9 is a sectional view taken on line 9—9 of FIG. 7;

FIG. 10 is another plan view, partly broken away, showing another article made in accordance with the teaching of the present invention having electrically conductive portions;

FIG. 11 is a sectional view taken on line 11—11 of FIG. 9;

FIG. 12 is a plan view of an article made according to the teaching of the present invention having an electrically conductive circuit component; and FIG. 13 is a sectional view taken on line 13—13 of FIG. 11.

A molded article made according to the teaching of the present invention comprises, as its principal components, a material, or composition, which is initially liquid in character so that it can be used as an impregnating material and a material which is sufficiently porous or otherwise absorbent to receive the first-mentioned material and act as a filler or reinforcing medium for the molded article. A preferred reinforcing material is glass fiber in the form of mats but any reinforcing or fortifying material which is sufficiently porous or otherwise absorbent can be used, it being understood that the ultimate strength and physical properties of the molded article may vary quite considerably depending upon the strength and nature of the particular reinforcing material employed. Examples of other reinforcing materials which may be used are cloth, paper, and even such substances as floc, cork or sawdust in mat form.

The impregnating material, or composition, i.e. the material which penetrates the porous reinforcing material is preferably a resin or varnish which may be polymerized under heat and pressure or to a thermostat substantially infusible hardened state. A preferred thermosetting resin is a polyester which may be described generally as being a polymerizable material consisting of a mixture of a maleic anhydride containing alkyd resin, a polymerizable monomer such as styrene or diallyl phthalate, and a light stabilizing substance which has the ability to absorb ultra-violet light. The resinous component may contain other mono or dibasic acids than maleic, usually phthalic and/or adipic, which have been reacted with polyhydric alcohols such as ethylene glycol or other glycols. The over-all mixture is polymerized by peroxide either with or without heat, and contains an oxidation inhibitor usually of the phenolic type to prevent spontaneous polymerization. Other resins or varnishes having properties substantially similar to a polyester as just described may be employed within the broad teaching of the present invention, but as stated, a polyester resin is preferred.

In order to obtain a design or the like in an article, such as a sign, made according to the teaching of the present invention, a coloring pigment is added to the polyester. By having one color in the polyester used to apply the design to a surface mat of the reinforcing mats and by having another color in the polyester which is used to impregnate the main body and background surface of the molded article, it is possible to obtain color separation in the article with actual bonding together and similar molecular structure of the portion of the article which includes the design and the remaining portion of the article. It is thus apparent why a design or the like formed according to the teaching of the present invention is so permanent in nature.

Figure 1:
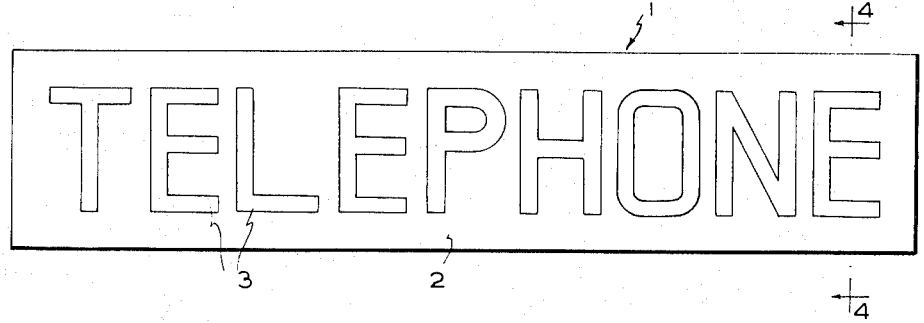
FIG. 1 is a front elevation view of a sign made according to the teaching of the present invention.

As an example of an article made in accordance with the teaching of the present invention, reference is made to FIG. 1 of the drawings which shows a sign 1 having the word "TELEPHONE" at the front surface 2 thereof. In making such a sign, the following procedure was followed:

Approximately 9½ grams of a screening on composition were applied to a glass fiber mat of a commercial grade known as surface mat. The mat is 4½" wide, 27" long and approximately .015 thick. The screening on composition was applied according to the screen processing technique known generally as the silk screen technique. However, a stainless steel screen (130 mesh having about 48% open space) was utilized instead of the usual silk screen because it was found that in the practice of the present invention a metal screen will hold up better. Further details concerning the screening on technique are deemed unnecessary since they are well known to those skilled in the art of sign and display making.

The screening on composition was as follows:

| Constituent: | Percent by weight |
| --- | --- |
| Polyester resin | 50.25 |
| Inert filler, aluminum silicate, ASP 100 | 42.00 |
| Yellow pigment in a polyester base | 6.25 |
| Peroxide catalyst | 1.5 |

The polyester resin consisted of 70% polyester and 30% styrene and is a typical polyester such as that made by condensing an unsaturated dibasic acid, such as maleic anhydride, with a glycol, such as diethylene glycol. This reaction is according to the following representative formula:

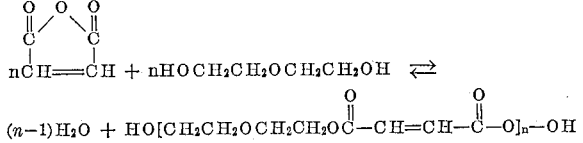

Physical properties of such a polyester are as follows:

| | |
| --- | --- |
| Viscosity (c.p.s.) | 2000–2400. |
| Color | 100 max. (APHA). |
| Odor | Styrene. |
| Polyester con. | 70%. |
| Specific gravity | 1.143–1.153. |
| Ref. index | 1.5362. |
| Acid number | 35 max. |

The aluminum silicate is an inert filler which decreased the amount of polyester needed in the composition and gave added strength to the finished article. The ASP 100 designation means plate-like particles of aluminum silicate less than 2 microns in "equivalent spherical diameter."

The yellow pigment was a commercial grade of finely ground pigment embodied in a polyester base in order to make it easier to disperse the pigment uniformly throughout the entire screening-on composition.

The catalyst was that known to the trade as DDM, which is a ketone peroxide catalyst, namely, methyl, ethyl ketone peroxide in dimethyl phthalate. It is a liquid having a typical peroxide assay of 60% and a minimum active oxygen of 11%.

In order to make the screening-on composition readily workable according to the screen processing technique, it will usually be necessary to thin the formula with a thinner such as amyl acetate. In the above example, the 9½ grams of the screening-on composition were thinned with amyl acetate to have a viscosity and pour point like that obtained by adding 1% by weight of amyl acetate to the above-identified formula at 85° F. and 60% humidity. The workability of the composition is then such that it may be readily screen processed and it was screen processed onto the front of the glass fiber surface mat until the resin penetrated into the mat substantially its entire depth of .015". Also, of course, the screening-on design was such that the word "TELEPHONE" was formed on the surface mat as shown in FIG. 1 of the drawings. The reference numeral 3 indicates the screening-on composition forming the letter design making up the word "TELEPHONE."

The screening-on composition was then allowed to gel partially, which action takes place in a period of from 12 to 24 hours after the screening-on is done. Actually, when the catalyst is added to the polyester, the inhibitor in the polyester is at least partially neutralized and the polyester therefore starts to polymerize even at room temperature. Once the catalyst is added, the polyester has a pot life, meaning a period within which it can be handled readily as a liquid, of up to about one hour. After that, it starts to gel and if allowed to stand for a period in excess of say 24 hours, it will become substantially hard or substantially completely polymerized at room temperature. As is brought out more fully hereinafter, the polymerization is hastened and completed by heat and pressure. It is apparent that both temperature and humidity will have an effect on the gel time. When the formula is in a gel condition it is tacky to the touch.

Figure 2:
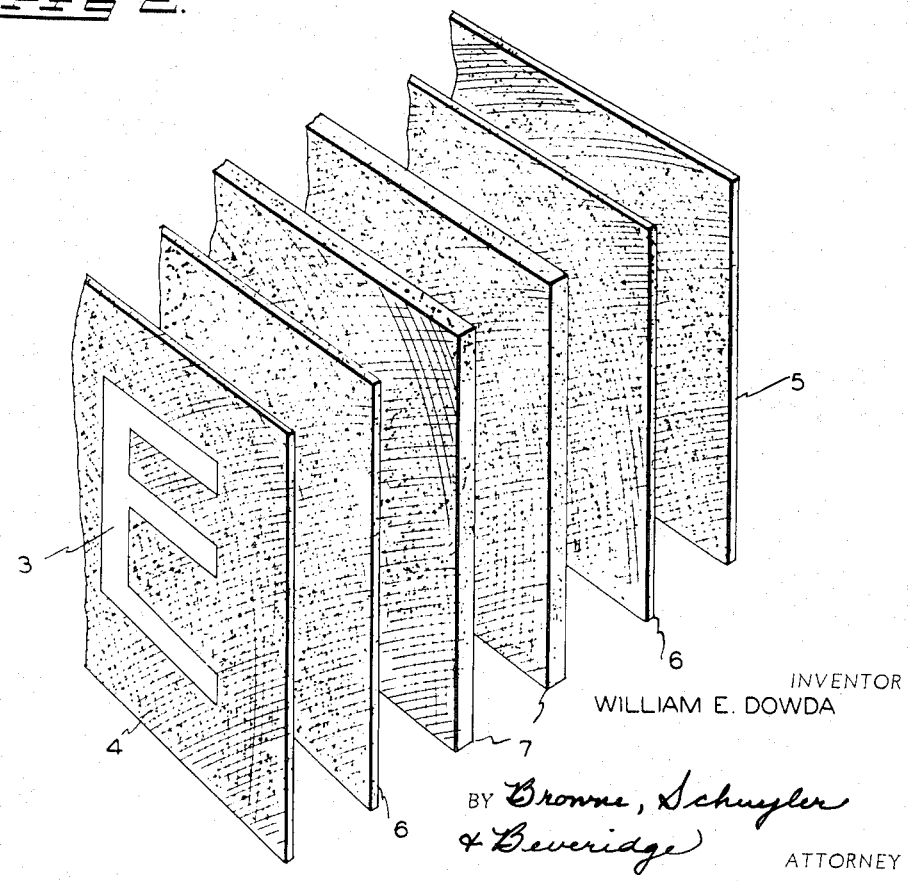
FIG. 2 is an exploded perspective view of a portion of the sign shown in FIG. 1 showing component parts of the completed sign.

After the screening-on of the design was completed as described above, the mat 4 containing the lettering was assembled with other reinforcing mats of the same length and width to make up the complete sign. The various mats are shown in FIG. 2 where it will be noted that there is a front surface mat 4 which includes the lettering, a back surface mat 5 and a plurality of intermediate reinforcing mats located between the front and back mats 4 and 5. The intermediate reinforcing mats located next to the front and rear mats 4 and 5 are indicated by the reference numeral 6 and are preferably of a grade and texture corresponding to the front and back mats. The middlemost reinforcing mats 7 are preferably of somewhat coarser texture than the other mats. In the process being described, the mats 4, 5 and 6 were glass fiber mats of the commercial grade known as surface mat. Mats 7 were glass fiber mats of the commercial grade known as reinforcing mats. The reinforcing mats are of much coarser texture than the surface mats but are quite suitable for use in the middle of the sign panel. The relatively fine pores of the surface mats give the front and back surfaces of the sign a smooth appearance.

While glass fiber mats are a preferred reinforcing material employed in the practice of the present invention, other suitable porous materials may be employed as has been mentioned above. Also, while a plurality of intermediate reinforcing mats has been referred to in the example being described, the sign panel could consist of fewer sheets of porous material if desired. Thus, one could eliminate some of the intermediate reinforcing mats and, if desired, employ only a front mat and a backing mat. In the preferred practice of the present invention, more than merely a front mat and a back mat will be employed.

The various reinforcing mats were assembled by placing them in a mold as shown in FIG. 3 where the reference numeral 8 indicates the female part of the mold having the cavity 9 into which the reinforcing mats are placed and the reference numeral 10 indicates the male plunger of the mold which, as is described more in detail hereinafter, enters the cavity 9 to compress the reinforcing mats during formation of the molded sign panel. In placing the reinforcing mats in mold cavity 9, the back surface mat 5 was placed in the cavity first, then an intermediate reinforcing mat 6 was placed on top of mat 5, and then one of the coarser intermediate mats 7 was placed on top of intermediate mat 6.

At this point, approximately 160.5 grams of a molding composition were spread substantially uniformly over the exposed upper surface of the intermediate reinforcing mat 7 in the mold at this stage of the process. This molding composition is indicated by the reference numeral 11 in FIG. 3 and the composition was as follows:

| Constituent: | Percent by weight |
| --- | --- |
| Polyester resin | 67.00 |
| Inert filler, aluminum silicate ASP 100 | 28.00 |
| Blue pigment in a polyester base | 4.5 |
| Peroxide catalyst | 0.5 |

The polyester in the above composition was like that described in connection with the screening-on composition. The ASP 100 designation for the aluminum silicate has the same meaning as has been described in connection with the screening-on composition and the only substantial difference between the pigment in the molding composition from the pigment in the screening-on composition is one of color, as is apparent.

The peroxide catalyst employed in the molding composition is known commercially as ATC being a diacyl peroxide, namely benzoyl peroxide compounded with tricresyl phosphate. It is a thick paste having a typical peroxide assay of 50% and a minimum active oxygen of 3.3%.

After the molding composition 11 was added as described above, the other coarser intermediate mat 7 was placed on top of the molding composition, then the other intermediate mat 6 was placed on top of mat 7, and, finally, the front surface mat 4 was placed on top of mat 6 with the lettering uppermost. The relative positioning of the various mats and the molding composition 11 is shown in FIG. 3 where, it will be observed that, in effect, the molding composition is sandwiched between the mats. The mold was then closed, by suitable means not shown, so that the male plunger advanced into cavity 9 to compress the various mats and the thermosetting compositions all located in the mold cavity 9. Pressure was applied to the mats and the thermosetting compositions at substantially 60 p.s.i. at a temperature from 230° to 250° F. until the thermosetting compositions became fully cured. This requires from two to three minutes.

At the end of this time, the mold was opened and the completed sign panel removed from the mold cavity. The thickness of the sign panel was approximately .095 inch as compared to an initial over-all thickness of approximately .150 inch of the assembled mats when first laid up in the mold. The molding composition 11 penetrated from the middle to both the top and bottom or front and back, surfaces of the sign panel and flowed around the edges of the panel to close in and seal off the projecting ends of the glass fibers. To insure that flow does occur around the edges of the glass fiber mats, the mold is approximately 1/16 inch longer than the 27 inch length of the mats and is approximately 1/16 inch wider than the 4½ inch width of the mats. Because of the relatively fine porosity of the front and back surface mats 4 and 5, the outer surfaces of the panel were substantially smooth and colored uniformly a deep blue.

The screened-on lettering retained its sharp outline and substantially its original yellow color. As has been mentioned above, the screened-on composition making up the lettering was in a gel condition when it was placed in the mold, which means that it was in a state of partial cure. When the mold was closed and heat and pressure applied to the lettering, it went from its gel condition to a liquid condition in approximately 1½ minutes and then went back through a gel condition to a final cure or hardening. The latter phase occurred during the final portion of the two to three minutes that it took for the panel to be cured or polymerized. The molding composition went to a more liquid condition in from approximately 5 to 20 seconds after the mold was closed. It then started to gel and hardened in from one to two minutes after the mold was closed. The gelled lettering apparently prevents the quickly liquid molding composition from penetrating into that portion of the surface mat 4 which contains the lettering and this appears to account for the relatively sharp outline which the lettering retains in the finished article. Conversely, by the time that the screened-on composition becomes liquid, i.e., approximately 1½ minutes from the time the mold is closed, the molding composition has gelled and appears to prevent the screened-on composition from spreading out in the surface mat 4 and creating fuzziness at the edges of the letters. When both thermosetting compositions are cured there appears to be an actual molecular linking due to the polymerization action which occurs.

The weight of the completed sign panel shown in FIGS. 1 and 4 is approximately 259 grams made up of approximately 89 grams of glass fiber mats, 160.5 grams of molding composition and 9½ grams of screened-on composition. The sign is relatively lightweight for its size, is quite strong but somewhat flexible, and will withstand substantial punishment. The yellow lettering 3 lies substantially flush with the outer surface of mat 4 and is practically indestructible since it is an integral part of the complete sign.

A number of other signs having the same dimensions as the sign shown in FIG. 1 were made according to the process described above. However, in these signs the words COCA-COLA were screened-on to the surface mat 4 instead of the word "TELEPHONE." Furthermore, the lettering was in white and the background was red. The screening-on composition used in this instance was as follows:

| Constituent: | Percent by weight |
| --- | --- |
| Polyester resin | 52.5 |
| Inert filler, calcium carbonate | 44.0 |
| White pigment—rutile | 2.5 |
| Peroxide catalyst | 1.0 |

The polyester resin employed was like that described in connection with the first example of a screening-on composition given above and the catalyst was likewise the same. The calcium carbonate is simply a finely ground inert filler which was used in this example in place of the aluminum silicate mentioned in the first example. The white pigment is titanium dioxide of the type known as rutile.

The molding composition was as follows:

| Constituent: | Percent by weight |
| --- | --- |
| Polyester resin | 69.00 |
| Inert filler, calcium carbonate | 25.00 |
| Red pigment in a polyester base | 5.00 |
| Peroxide catalyst | 1.00 |

The polyester resin and inert filler were the same as described above in connection with the screening-on composition employed in this particular example. The red pigment is, of course, for the red background and the catalyst employed is of the type known to the trade as ATC described above.

Where the lettering to be applied to a sign panel is relatively small, or the design is otherwise fine in detail, it is desirable to employ a transfer technique in lieu of screening the lettering or other design directly onto the surface mat 4 as has been described above. In the transfer technique, the lettering or other design is screened onto a surface of a sheet of finely grained material, preferably metal foil, in reverse. This is shown in FIG. 5 where the reference numeral 12 indicates a sheet of suitable material, preferably aluminum foil, having the letters TE screened in reverse onto the surface 13 of the foil sheet. These letters, or for that matter any desired lettering or design, are screened onto the foil surface 13 by the screen process technique described above in connection with the application of the lettering 3 to surface mat 4. However, in the present instance, the lettering is first applied in reverse to the foil surface where it is allowed to gel partially.

In making a sign utilizing this transfer technique, the foil containing the screened on lettering in reverse is placed on top of the uppermost mat in the mold and then the mold is closed and pressure and temperature applied as described above. The pressure and temperature causes the lettering or other design on the foil surface to transfer from the foil to the surface mat against which it is applied and the resulting product resembles a sign obtained according to the process described above wherein the lettering or other design is screened directly onto the surface mat. However, it is found that the transfer technique does result in sharper lettering and finer design which is particularly advantageous where small lettering is being applied. Also, the metal foil acts as the upper mold surface and produces a very nice finish on the front surface of the sign panel. The resultant lettering lies substantially flush with the panel surface to which it is applied. If it is desired to obtain greater depth of penetration of the lettering into the mat surface to which it is being transferred, several coats of screening-on composition can be screened onto the surface of the foil.

It is found that polyester resins manufactured by a number of different manufacturers may be employed with success in the practice of the present invention. Naturally, the exact composition of a particular polyester resin will very depending upon a particular physical or chemical property which the manufacturer desires the polyester to have. Consequently, it is possible to order polyester resins having a certain degree of flexibility or some other property and the range available on the market today is substantial. However, as a general proposition, polyesters generally may be employed in the practice of the present invention.

As regards the screening-on composition, the constituents may vary in percent range in accordance with the following tabulation:

| Constituent: | Percent by weight |
| --- | --- |
| Polyester resin | 30–60 |
| Inert filler | 30–60 |
| Pigment | Up to 10 |
| Catalyst | ½ to 2½ |

Likewise, in the molding composition, the constituents may vary in percent according to the following tabulation:

| Constituent: | Percent by weight |
| --- | --- |
| Polyester resin | 25–80 |
| Inert filler | 15–60 |
| Pigment | Up to 10 |
| Catalyst | ½ to 2½ |

The chosen percentages for a particular article will depend upon physical and chemical properties desired in the article and in turn upon the materials available and their properties to meet the desired properties of the final article. Consequently, there can be a variation in the percent of polyester as compared to the percent of filler. Generally speaking, the more rigid the panel is to be the more filler will be used while the more flexible the panel is to be the less filler will be used. The pigment concentration depends upon the type of color. Lighter colors, particularly pastels, require a relatively lower percent of pigment as compared to denser, stronger colors.

The process described above in connection with the making of a sign wherein the design is different in color from the background adapts itself readily to making a reflective sign. As was described above, the screened-on lettering goes from a gel condition to a liquid condition, then back through a gel condition to a hardened or cured condition. If the molding is interrupted while the lettering is going through its second gel condition prior to hardening or curing, the letters are still tacky but the background or body of the panel has cured.

At this point in the molding cycle small size glass beads, or other suitable light reflective beads, may be dusted onto the tacky letters and will adhere thereto. The excess can be removed from the hardened background surface by blowing them away with an air hose or by brushing them away. The mold is then closed to complete the cure.

This is illustrated in FIGS. 6 and 7 where glass beads 14 are shown as being applied to letter surfaces 15. The glass beads 14 are pressed into the surfaces 15 so that the greatest bulge or diameter of each bead is below the surface of the lettering (see FIG. 7). This insures that they will be gripped firmly by the cured screened-on composition. To enable this to be accomplished with substantial precision, the mold is provided with a .004" shim at each side, as indicated by the numeral 16 in FIG. 6. In other words, the molding technique is the same when making a light reflective sign as it is when making a non-reflective sign as described above except for the steps involving the application of the light reflective beads and the subsequent operation of the mold to accommodate the beads during the final stage of curing of the sign. To illustrate further, the molding technique is the same up to that point where the molding is interrupted while the lettering is still tacky but the background, which involves the molding composition, has cured. The glass beads are dusted onto the tacky lettering and the side shims 16 are in place so that the mold plunger 10 cannot advance into the mold cavity 9 so far as to press the beads 14 completely flush with the outer surface of the sign panel. The shims 16 thus insure that the beads 14 are pressed into the lettering 15 so that they do lie mostly below the outer surface of the panel but, nevertheless, project beyond this outer surface in the manner shown in FIG. 7.

In the making of a sign having the word "TELEPHONE," number 10 glass beads, i.e., those having a diameter of approximately .010 inch, were applied to the lettering while it was tacky and the sign completed according to the procedure just described. The resulting sign was found to be rugged in the sense that the glass beads are held firmly in place and even resist actual mechanical scraping to remove them. They are held much more firmly in place than if they were retained merely by an adhesion process and yet they extend beyond the surface of the sign so as to be effective for light reflective purposes. The reflecting properties of the sign are such that it will glow back at night when, for example, the light from an automobile headlights are directed toward the sign.

In employing the teaching of the present invention in the formation of articles having electrically conductive portions, such as electrical circuits and circuit components of the type generally referred to as printed circuits, electrically conductive particles are included in the screening-on composition. In fact, the technique is versatile in that one portion of an electrical circuit can be screened onto a surface mat utilizing a screening-on composition of one degree of electrical conductivity and then another portion of the circuit can be screened-on utilizing a screening-on composition having a different degree electrical conductivity. In this manner, an electrically conductive circuit layout can be made wherein resistances, for example, are incorporated directly in the circuit by the molding technique. Crossovers are formed readily by screening-on a circuit portion which is conductive, then screening a non-conductive composition onto a portion of the conductive part, and then screening on another conductive composition so as to cross the first conductive composition but with the non-conductive composition sandwiched in between so as to insulate the two conductive portions. The technique thus has great versatility for forming desired circuit layouts and electrical components.

One type of molded article having electrically conductive portions according to the teaching of the present invention is illustrated in FIGS. 8 and 9. This is actually a type of so-called printed circuit which may be utilized as an amplifier circuit. The article shown in FIGS. 8 and 9 is formed according to the following procedure.

Portions of the circuit design designated by the reference numbers 17 and 18 are screened onto the front or upper surface of a surface mat such as mat 4 described above according to the screening-on technique described above. However, the screening-on composition employed is as follows:

| Constituent: | Percent by weight |
|---|---|
| Polyester resin | 30 |
| Powdered silver | 69 |
| Peroxide catalyst | 1 |

The polyester resin referred to immediately above is of the type described in connection with the process described above for making sign panels. The powdered silver is fine silver particles capable of passing through a 200 mesh screen. The catalyst is DDM which has been described above.

At this point it is noted that, while the silver concentration is given as 69%, the actual percent of silver can be varied to provide the desired conductivity in the cured composition. Thus, the percent of silver can vary from 50% to approximately 85% with a correspondingly less amount of polyester resin as the percent of silver is increased.

After the portions 17 are screened onto the surface mat, a second screening-on is accomplished to place circuit portion 19 in between portions 17 and 18 as shown in FIG. 8. Circuit portion 19 is applied utilizing a screening-on composition which includes electrically conductive particles different from silver, powdered carbon for example. Otherwise, the screening-on composition for portion 19 can be the same as the screening-on composition for portions 17 and 18. Inasmuch as the carbon has a different electrical conductivity from the silver, it is apparent that the completed conductive path comprising portions 17, 18 and 19 includes parts of different electrical conductivity. In fact, circuit portion 19 is, in effect, a built-in resistance as compared to circuit portions 17 and 18.

After the electrically conductive screening-on compositions are applied as described, the procedure can then be followed as outlined above to make up the completed article. In other words, the desired number of reinforcing mats are placed in the mold, the molding composition is placed in the middle, the surface mat containing the screened-on circuit design is then placed on top with the design uppermost, and the mold closed and heat and pressure applied to cure the article. The resultant article possesses the distinct advantages that the electrically conductive portions are, in effect, inlaid in the surface and are thus very permanent in nature. Furthermore, it is easy to solder or otherwise connect to the electrically conductive part because it is not as subject to peeling or splitting off as conductive parts which are applied to a background material by adhesion techniques. An electrically conductive portion incorporated in a molded article according to the teaching of the present invention is literally built into the whole article and will withstand considerably rough treatment without breaking or otherwise becoming defective.

FIGS. 10 and 11 show a portion of a molded article made according to the teaching of the present invention where the molded article includes an electrically conductive portion which crosses over other electrically conductive portions but is separated therefrom by an insulating portion. Thus, referring to FIGS. 10 and 11, electrically conductive portion 20 crosses electrically conductive portions 21 and 22 but is separated therefrom by insulating portions 23 and 24. This is accomplished by screening onto a surface mat of the type such as mat 4 described above, a screening-on composition including powdered silver, for example, as described above in connection with the formation of the article shown in FIGS. 8 and 9 to form the electrically conductive portions 21 and 22. Insulating portions 23 and 24 are then screened onto and over a part of each of the parts 21 and 22 as shown in FIG. 10. The insulating screening-on composition may be a composition such as that described above in connection with the making of a sign panel wherein the inert filler used in conjunction with the polyester resin is such that the resulting composition is substantially electrically non-conductive. It is, of course, to be understood that in all of the molded articles employing electrically conductive portions, the body or remainder of the article is formed of substantially electrically non-conductive material. Of course, when glass fiber mats are employed as the reinforcing medium and the screening-on and molding compositions embody polyesters and inert materials such as calcium carbonate and aluminum silicate, then the resulting panel is substantially electrically non-conductive.

After the insulating portions 23 and 24 have been screened on as just described, the electrically conductive portion 20 may then be screened on as shown in FIG. 10. It thus crosses conductive portions 21 and 22 but is separated therefrom by the insulating portions 23 and 24. Conductive portion 20 will be applied utilizing a screening-on composition including powdered silver as described above or other substance which makes the screening-on composition suitably electrically conductive when it hardens. In this multiple screening-on technique of applying successive screened-on portions to the surface mat, the successive screening-on is accomplished at sufficient time intervals so that one screened-on portion has gelled partially before the next screened-on portion is applied. While not absolutely necessary, it is desirable that some gelling be allowed to occur to preserve the desired conductive or non-conductive porperties of the screened-on composition in accordance with the composition as originally made up.

Once the screening-on has been accomplished as described in connection with the articles shown in FIGS. 10 and 11, then the molding is completed according to the technique described in connection with the formation of a sign panel. In other words, the desired number of reinforcing mats are placed in the mold with the desired molding composition and the surface mat is placed in the mold with the side which includes the circuit design being uppermost. The mold is closed and heat and pressure applied to effect the cure.

FIGS. 12 and 13 show a circuit component, a capacitor, made according to the teaching of the present invention. In this instance, the capacitor plates 25 and 26 are screened onto separate surface mats utilizing a screening-on composition of the type described in connection with the formation of the article shown in FIGS. 8 and 9. One surface mat including the conductive portion 26 is placed face down in the mold and the other surface mat including the conductive portion 25 is placed face up in mold with the additional reinforcing mats located between and, of course, the molding composition placed in the middle. The molding is then accomplished according to the technique described above. When the article is completed, leads 27 and 28 may be soldered or otherwise suitably connected electrically to conductive portions or capacitor plates 25 and 26. The body 29 of the panel forms the diaelectric between the plates 25 and 26.

In the practice of the present invention in making sign panels, for example, both surfaces of the sign can have lettering thereon instead of only one surface. To make a double face sign it is simply necessary to screen-on the desired lettering or other design onto the front surface mat and the back surface mat and then proceed to make up the complete sign in accordance with the procedure as described in making a sign with lettering on one surface only. Of course, the back surface mat is placed in the mold with the surface including the design being face down. Likewise, it is possible to make a sign panel wherein both surface mats have a screened-on design of one color and a screened-on background of a different color. A clear molding composition is used in the body of the panel. The resulting panel has colored faces, each bearing a design such as lettering, and a translucent interior. Edge lighting can be applied to such panel to good effect since the panel body located between the opposite faces is essentially translucent and the lighting will pass edgewise through the panel body and enhance the appearance of the lettering or other design appearing at the surfaces.

It is thus seen that I provide molded articles and methods of producing same wherein the resulting articles include a design, such as lettering, electrically conductive portions, etc., which is essentially an integral part of the completed article and is thus essentially permanent in nature. Such a design resists damage well and, as compared to a design painted on metal for example, is much less subject to damage from foreign objects. Highway markers are an example of a sign usually made of metal which is subject to damage from stones, bullets and the like. Being of metal, once they are struck by a bullet, stone, or the like, they will rust where the paint is chipped off and much replacement is necessary in the course of a year. I have found that a molded sign panel made according to the teaching of the present invention may be literally peppered with rifle bullets and still retain essentially its shape and appearance. A rifle bullet will go through the panel cleanly, leaving only a small opening, and the panel will not rust.

While I have described and illustrated embodiments of my invention, I wish it to be understood that I do not intend to be restricted solely thereto but that I do intend to cover all modifications thereof which would be apparent to one skilled in the art and which come within the spirit and scope of my invention.

What I claim as my invention is:

1. The method of making a molded article such as a sign panel which comprises the steps applying a first thermosettable material, initially liquid in character, onto a portion of one surface of a sheet of porous reinforcing material so as to form a design on said surface, said first thermosettable material being applied so as to extend inwardly into said sheet from the surface portion to which the thermosettable material is applied, then contacting the opposite surface of said sheet of porous material with a second thermosettable material, initially liquid in character, throughout substantially the entire area of said opposite surface, then applying heat and pressure to said porous sheet and said thermosettable materials to force said second thermosettable material to penetrate into said sheet throughout the remainder of said sheet not penetrated by said first thermosettable material, interrupting said heat and pressure while said first thermosettable material is still tacky, dusting a plurality of small light reflective beads onto that portion of the surface of said porous sheet occupied by said first thermosettable material, then reapplying heat and pressure to said porous sheet, said thermosettable materials and said light reflective beads to embed said beads in the surface portion of said sheet occupied by said first thermosettable material and to cure said first thermosettable material whereby said beads are held in place by said first thermosettable material, said beads being embedded so as to lie mostly within the portion of said surface occupied by said first thermosettable material but nevertheless projecting slightly outward from said surface.

2. The method of making a molded article having electrically conductive portions which comprises the steps of applying a first thermosettable material having a plurality of finally divided electrically conductive particles dispersed therethrough onto a portion of one surface of a sheet of porous material and making said first thermosettable material and the electrically conductive particles dispersed therethrough penetrate into said sheet from the surface portion to which said material is applied, then applying a second electrically non-conductive thermosettable material onto part of the sheet surface portion to which said first thermosettable material was applied so as to cover part of said first thermosettable material with said second thermosettable material, and then applying a third thermosettable material having a plurality of finally divided electrically conductive particles dispersed therethrough onto another portion of said surface of said sheet of porous material and making said third thermosettable material and the electrically conducted particles dispersed therethrough penetrate into said sheet from the surface portion to which said third material is applied, said thermosettable material extending across the sheet surface portion to which said first thermosettable material was applied but being separated from said first thermosettable material by said second thermosettable material whereby said first and third thermosettable materials are insulated electrically from each other.

3. The method of making a molded article such as a sign panel which comprises the steps of applying a first thermosettable composition including a substantial proportion of a polyester resin and a minor proportion of a color pigment dispersed throughout said composition to a portion of one surface of a surface layer of porous reinforcing material so as to form a design on said surface, said first composition being caused to penetrate into said surface layer from the surface portion occupied by said first composition, placing a backing layer of porous reinforcing material in a mold, covering a surface of said backing layer with a second thermosettable composition including a substantial portion of a polyester resin and a minor proportion of a color pigment dispersed throughout said second composition, said last named color pigment being different in color from the color pigment dispersed throughout said first composition, placing another surface of said surface layer of porous material in contact with said second thermosettable material so that said second thermosettable material is sandwiched between said surface layer and said backing layer, and then closing said mold and applying heat and pressure to said layers of porous reinforcing material and said thermosettable compositions to compress said thermosettable compositions and force said second thermosettable composition to penetrate into said backing layer and into the remainder of said surface layer not occupied by said first thermosettable composition, said heat and pressure being applied until said thermosettable compositions harden, said second thermosettable composition, when hardened, bonding said surface layer and said backing layer together and forming a background for said design.

4. The method of making a molded article such as a sign panel which comprises the steps of applying a first thermosettable composition including a substantial proportion of a polyester resin and a minor proportion of a color pigment dispersed throughout said composition to a portion of a surface of a sheet of metal foil so as to form a design on said foil surface, placing in a mold a surface sheet of porous material, a backing sheet of porous material, and a body of a second thermosettable material including a substantial proportion of a polyester resin and a minor proportion of a color pigment dispersed throughout said second composition, said porous sheets and said second composition being disposed in said mold so that said second composition is sandwiched between said sheets and contacts the opposed surfaces of said sheet substantially throughout the area of said surfaces, then placing the surface of said foil bearing the first thermosettable composition against the exposed surface of said surface layer of porous material, then closing said mold and applying heat and pressure to transfer said first thermosettable material onto said surface layer of porous material, compress said second thermosettable material and cause it to penetrate into said backing sheet and the remainder of said surface sheet not penetrated by said first thermosettable material and continuing said heat and pressure until said thermosettable compositions are cured whereby the design on said foil surface is transferred to said surface sheet and the cured second thermosettable composition bonds said sheets together and forms a background for said design.

5. The method of making a molded article such as a sign panel which comprises the steps of screening onto a portion of a surface of a glass fiber surface mat a thermosettable polymerizable composition consisting essentially of, in percent by weight, from thirty to sixty percent of a polyester resin, from thirty to sixty percent of an inert granular filler, up to ten percent of a color pigment, and from one half to two and a half percent of a catalyst, said first composition being screened onto a portion of said surface of said surface mat to form a design on said surface and to extend inwardly into said surface mat from said design, then allowing said first composition to gel partially after it has been applied to said surface mat, then placing a glass fiber backing mat in a mold so that a surface of said backing mat is uppermost, covering said upper surface with a second thermosettable polymerizable composition consisting essentially of, in percent by weight, from twenty-five to eighty percent of a polyester resin, from fifteen to sixty percent of an inert granular filler, up to ten percent of a color pigment, and from one half to two and a half percent of a catalyst, then placing said surface mat onto said second composition with the surface of said surface mat bearing said design being uppermost, then closing said mold and applying a pressure of approximately sixty pounds per square inch to compress said glass fiber mats and said thermosettable compositions, said mold being maintained at a temperature from 230° to 250° F. and said pressure and temperature being applied for a period of from two to three minutes to cause said thermosettable compositions to polymerize and become cured.

6. The method of making a molded article such as a sign panel which comprises the steps of screening onto a portion of one surface of a sheet of porous material a thermosettable composition comprising a substantial proportion of polyester resin, said composition being screened onto said surface of said sheet so as to form a design on said surface and to penetrate inwardly into said sheet from said design, allowing said composition to gel partially after it has been applied to said sheet, placing a backing sheet of porous material in a mold so that one surface of said backing sheet is uppermost, covering said upper surface of said backing sheet with a second thermosettable composition comprising a substantial proportion of a polyester resin, placing said surface sheet of porous material onto said second composition with the surface of said surface sheet having the design applied thereto uppermost, closing said mold and applying heat and pressure to harden said thermosettable compositions and cause said second thermosettable composition to penetrate throughout said backing sheet and the remainder of said surface sheet not penetrated by said first thermosettable composition, opening said mold before said first thermosettable composition is fully hardened, applying a multiplicity of small glass beads onto the portion of said surface of said surface sheet of porous material forming said design, then re-closing said mold and re-applying heat and pressure to fully harden said first thermosettable composition and secure said glass beads in place, said glass beads being partially embedded in that portion of the surface of said surface sheet forming said design.

7. The method of making a molded article having electrically conductive portions which comprises the steps of applying onto a surface of a surface layer of porous substantially electrically non-conductive material a first thermosettable composition including a polyester resin and a multiplicity of finally divided metal particles dispersed throughout said composition, said composition being applied to said surface portion and extending inwardly into said surface layer from said surface portion to provide electrically conductive paths in said surface layer, placing a backing layer of porous substantially electrically non-conductive material in a mold with one surface of said backing layer uppermost, covering said uppermost surface with a second thermosettable composition including a polyester resin, placing said surface layer onto said second thermosettable composition with the surface having the first thermosettable composition applied thereto being uppermost, closing said mold and applying heat and pressure to harden said thermosettable compositions and bond said surface layer to said backing layer whereby said electrically conductive paths are effectively bonded into the resulting molded article.

References Cited by the Examiner
UNITED STATES PATENTS

| | | | |
|---|---|---|---|
| 1,804,508 | 5/1931 | Nicholson | 41—22 |
| 2,081,538 | 5/1937 | Hoarle | 41—21 |
| 2,379,741 | 7/1945 | Palmquist | 41—22 X |
| 2,541,497 | 2/1951 | Bauxbaum et al. | 35—66 |
| 2,624,967 | 1/1953 | Phillippi | 40—135 |
| 2,659,170 | 11/1953 | Hill | 117—38 |
| 2,776,235 | 1/1957 | Peck. | |
| 2,817,619 | 12/1957 | Bickel et al. | |
| 2,850,890 | 9/1958 | Rubenstein. | |
| 2,951,001 | 8/1960 | Rubenstein | 154—128 XR |

EARL M. BERGERT, *Primary Examiner.*
CARL K. KRAFFT, *Examiner.*